United States Patent
Pyatkovskiy (10) Patent No.: US 8,572,260 B2
(45) Date of Patent: Oct. 29, 2013

(54) PREDETERMINED PORTS FOR MULTI-CORE ARCHITECTURES

(75) Inventor: Maksim Pyatkovskiy, Encino, CA (US)

(73) Assignee: Ixia, Calabasas, CA (US)

( * ) Notice: Subject to any disclaimer, the term of this patent is extended or adjusted under 35 U.S.C. 154(b) by 382 days.

(21) Appl. No.: 12/970,138

(22) Filed: Dec. 16, 2010

(65) Prior Publication Data

US 2012/0131205 A1    May 24, 2012

Related U.S. Application Data

(63) Continuation-in-part of application No. 12/951,963, filed on Nov. 22, 2010.

(51) Int. Cl.
*G06F 15/16* (2006.01)

(52) U.S. Cl.
USPC ........... 709/227; 709/223; 709/224; 709/228; 709/230

(58) Field of Classification Search
USPC .................... 709/227, 223, 224, 228, 230
See application file for complete search history.

(56) References Cited

U.S. PATENT DOCUMENTS

| | | | |
|---|---|---|---|
| 5,724,602 A | 3/1998 | Tanaka et al. | |
| 6,122,670 A | 9/2000 | Bennett et al. | |
| 6,173,333 B1 | 1/2001 | Jolitz | |
| 6,295,557 B1 | 9/2001 | Foss | |
| 6,345,302 B1 | 2/2002 | Bennett et al. | |
| 6,954,463 B1 | 10/2005 | Ma et al. | |
| 7,095,716 B1 | 8/2006 | Ke et al. | |
| 7,149,230 B2 | 12/2006 | Coffin, III et al. | |
| 7,443,836 B2 | 10/2008 | Hooper | |
| 7,602,775 B1 | 10/2009 | Ke et al. | |
| 7,809,128 B2 | 10/2010 | Li et al. | |
| 8,352,777 B2 * | 1/2013 | Shilon et al. | 714/4.1 |
| 2004/0215803 A1 | 10/2004 | Yamada et al. | |
| 2007/0121516 A1 * | 5/2007 | Hannel et al. | 370/241 |
| 2008/0117907 A1 | 5/2008 | Hein | |
| 2010/0008248 A1 * | 1/2010 | Constantine et al. | 370/252 |
| 2010/0293280 A1 | 11/2010 | Namihira | |

OTHER PUBLICATIONS

Douglas Comer, Internetworking with TCP/IP Principles, Protocols and Architectures. Prentice Hall, 4th Edition, Chapter 7 (p. 95-113), Chapter 13 (p. 197-249), Chapter 32 (p. 581-597).

* cited by examiner

*Primary Examiner* — Lan-Dai T Truong
(74) *Attorney, Agent, or Firm* — SoCal IP Law Group LLP; John E. Gunther; Steven C. Sereboff (57) ABSTRACT

Methods, computing devices, and computer readable storage media to test network connections using a port unit having a plurality of processors. A plurality of transmission control protocol (TCP) connections to be initiated by the port unit during a test session may be defined. For each processor, an associated set of predetermined source port numbers corresponding to the plurality of TCP connections may be determined. A first processor of the plurality of processors may open TCP connections, via the network, from the defined plurality of TCP connections, wherein each TCP connection may be opened using the corresponding source port number from the set of source port numbers associated with the first processor.

14 Claims, 4 Drawing Sheets

PREDETERMINED PORTS FOR MULTI-CORE ARCHITECTURES

RELATED APPLICATION INFORMATION

This patent is a continuation-in-part of patent application Ser. No. 12/951,963, entitled PROCESSOR ALLOCATION FOR MULTI-CORE ARCHITECTURES, filed Nov. 22, 2010.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating connections for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, and layer 4 of the structure are the physical layer, the data link layer, the network layer, and the transport layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged.

A TCP connection is defined by a source IP address, a destination IP address (fields in the IP header of each packet of the TCP connection), a source TCP port, and a destination TCP port (fields in the TCP header of each TCP packet). TCP ports define what higher level protocol or process is using the services of the TCP connection. A TCP port should not be confused with a hardware port (a connection between a hardware device and a network). The header of each TCP packet contains a sequence number identifying the first data byte in the TCP packet, and an acknowledgement number identifying the next data byte expected to be received. The sequence and acknowledgement numbers are, in simplified terms, a count of the number of data bytes sent and received, respectively, over the TCP connection. Two devices communicating via a TCP connection maintain data indicating the highest sequence number transmitted and the highest acknowledgement number received. This information can be used to retransmit packets that are not acknowledged in a timely manner.

During normal network operation, TCP connections are typically opened, or initiated, by a client device requesting information or some other service from a server device. The client device may be, for example, a user computer sending and receiving HTTP messages as the user surfs the World Wide Web, or SMTP e-mail messages. The client device may have a single IP address and only one or two processor cores. The client device may have only a few TCP connections open concurrently, and may send TCP packets infrequently in response to user actions. The server may be a Web server or an e-mail server or other server. The server may have multiple processors or processor cores and may be capable of maintaining a large number of concurrent TCP connections.

A problem may arise if two or more of the processors in a client or server are allowed to process packets for the same TCP connection. Specifically, if a first TCP packet is being processed by a first processor and a second TCP packet for the same TCP connection is concurrently processed by a second processor, the second processor may read the TCP connection data before the first processor has updated the TCP connection data. Subsequently, the second processor will update and store the TCP connection data in ignorance of the first packet, such that the stored TCP connection data is inaccurate. Such concurrency issues may be avoided by synchronizing or restricting access to the TCP connection data. However, restricting access to the TCP connection data can, in some circumstances, lead to two or more processors stalled while attempting to access the same connection data. To avoid such problems, each TCP connection may be uniquely associated with a specific one of the server's multiple processor cores. In this patent, the term "uniquely associated" means there is a one-to-one correspondence between two groups of items.

For example, a hash function may be used to uniquely associate each received TCP packet, and thus each TCP connection, to a specific processor core. A hash function is any algorithm or mathematical function that converts a larger amount of data into a smaller amount of data, typically a single integer. The value returned by a hash function is called hash value. For example, a checksum is a hash value returned by successively adding portions of a larger string of data such as a packet.

Assuming the layer 3 protocol is IP.v4, each TCP connection is defined by a 32-bit IP source address, a 32-bit IP destination address, a 16-bit TCP source port number and a 16-bit TCP destination port number. Every packet transmitted or received via the TCP connection will contain the same two 32-bit IP addresses and two 16-bit TCP port numbers within the header of the packet. Thus each TCP connection is defined by a 96-bit number, obtained by concatenating the two 32-bit IP addresses assuming (IP.v4) and two 16-bit TCP port numbers, allowing a total of $2^{96}$ or $8 \times 10^{28}$ unique TCP connections.

To uniquely associate every possible TCP connection with one of the server's processors, a hash function may be used to convert the 96-bit number that defines each TCP connection into a value that identifies the associated processor. For example, if a server includes eight processors, a hash function may provide a 3-bit hash value that identifies a single one of the eight processors. The hash function may be implemented by hardware or software.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. Each packet in the test traffic may be a unicast packet intended for reception at a specific destination port or a multicast packet, which may be intended for reception at two or more destination ports. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

To test the layer 4 performance of a packet switched network or a network device, the test traffic may be or include a large plurality of stateful connections between one or more test port units and the network or device under test. The stateful connections may be intermingled with a large volume of stateless, or non-stateful, packets as described, for example, in U.S. Pat. No. 7,496,664 B2 and U.S. Pat. No. 7,194,535 B2.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
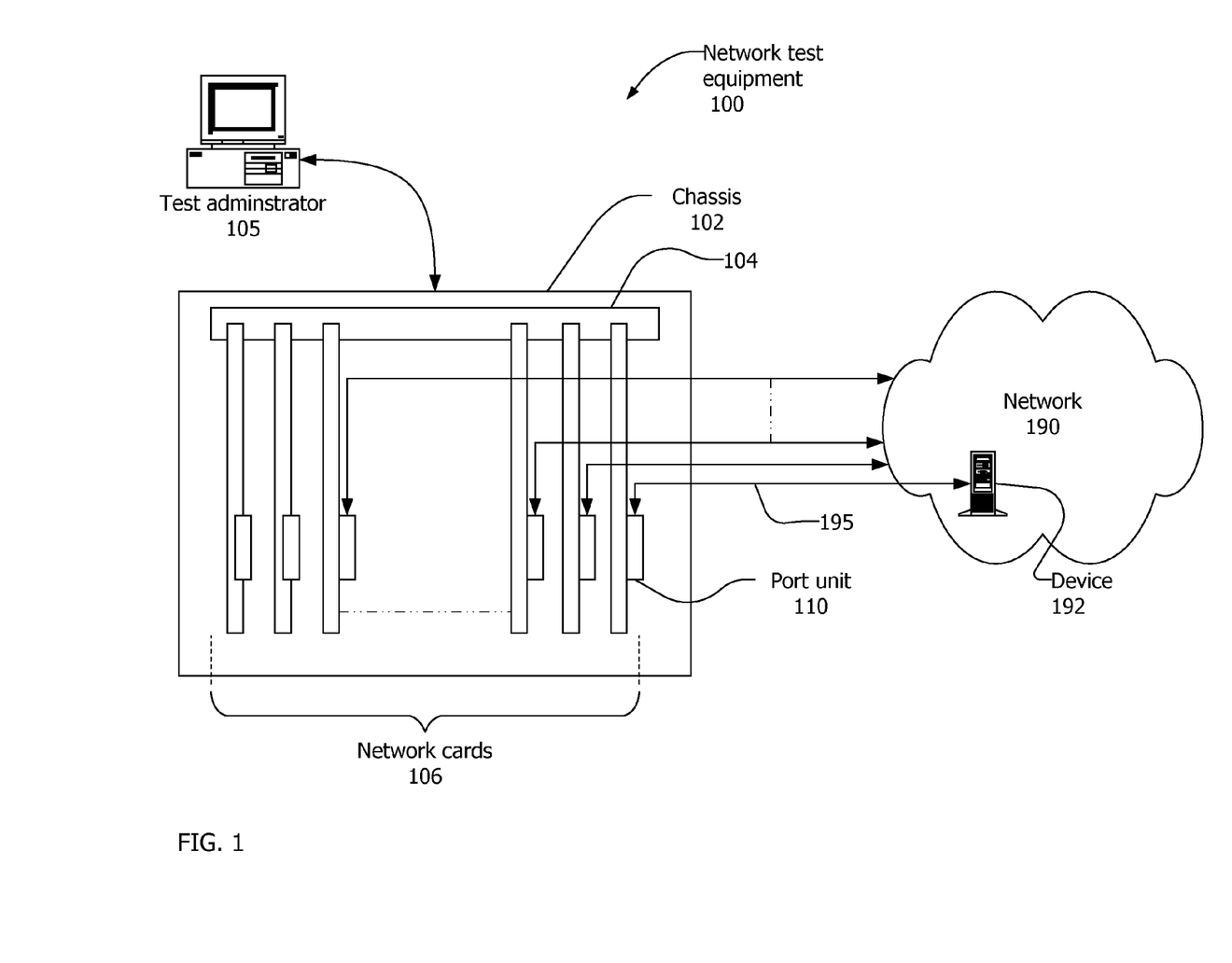
FIG. 1 is a block diagram of a network environment.

FIG. 1 shows a block diagram of a network environment. The environment may include network test equipment 100, a network 190 and plural network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors, and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may contain one or more port unit 110. Each port unit 110 may connect to the network 190 through one or more ports. Each port unit 110 may be connected to the network 190 through a communication medium 195, which may be a wire, an optical fiber, a wireless link, or other communication medium. Each network card 106 may support a single communications protocol, may support a number of related protocols, or may support a number of unrelated protocols. The network cards 106 may be permanently installed in the network test equipment 100 or may be removable.

The backplane 104 may serve as a bus or communications medium for the network cards 106. The backplane 104 may also provide power to the network cards 106.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel.

Figure 2:
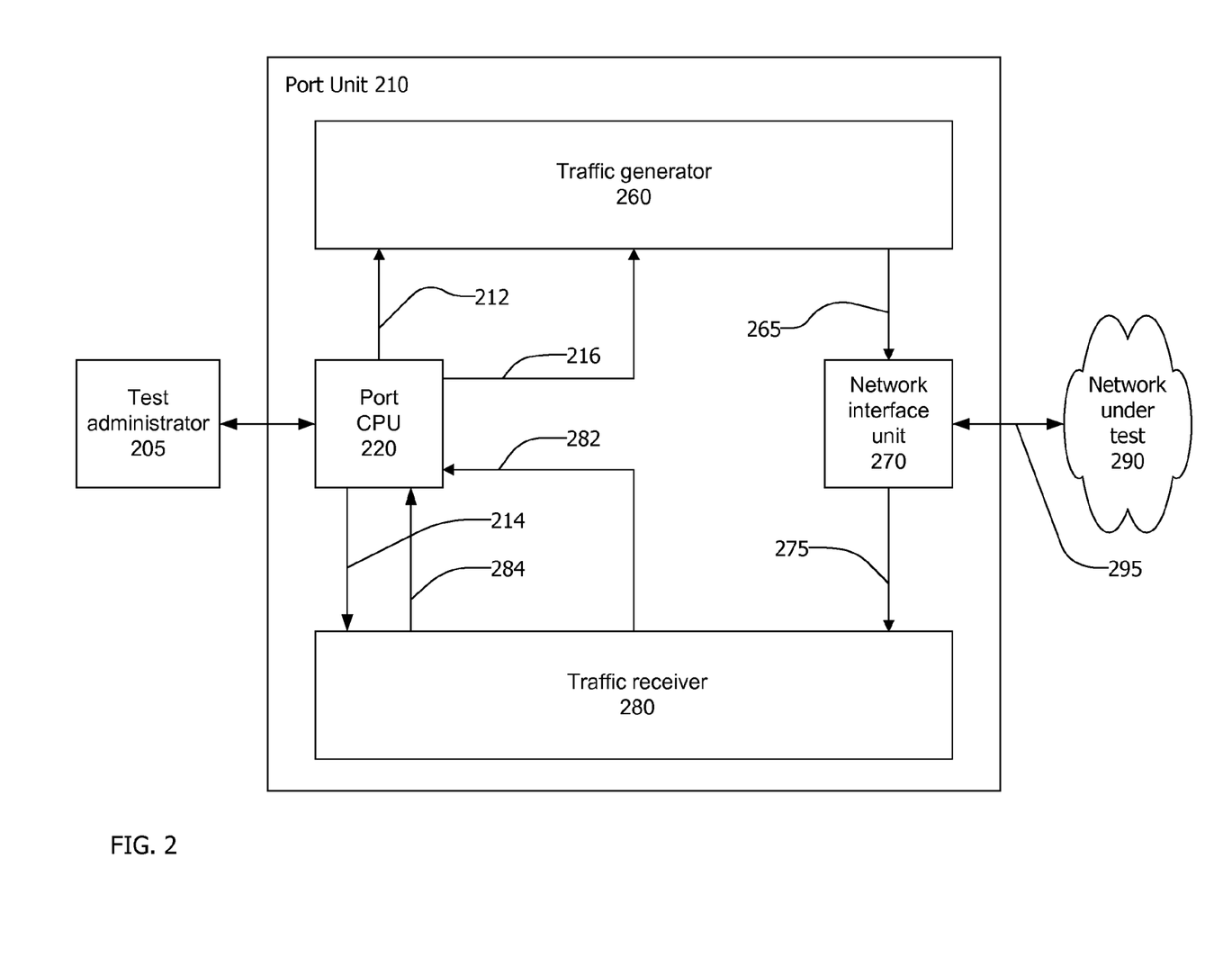
FIG. 2 is a block diagram of a port unit.

Referring now to FIG. 2, an exemplary port unit 210 may include a port central processing unit (CPU) 220, a traffic generator 260, a traffic receiver 280, and a network interface unit 270 which couples the port unit 210 to a network under test 290. The port unit 210 may be all or part of a network card 45 such as the network cards 106.

The port CPU 220 may include one or more processors, a memory coupled to the processors, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 220 may communicate with a test administrator 205. The test administrator 205 may be a computing device contained within, or external to, the network test equipment 100. The test administrator 205 may provide the port CPU 220 with instructions and data required for the port unit to participate in testing the network under test 290. The instructions and data received from the test administrator 205 may include, for example, definitions of packet streams to be generated by the port unit 210 and definitions of performance statistics that may be accumulated and reported by the port unit 210.

The port CPU 220 may provide the traffic generator 260 with stream forming data 212 to form a plurality of streams. The stream forming data 212 may include, for example, the type of packet, the frequency of transmission, definitions of fixed and variable-content fields within the packet and other information for each packet stream. The traffic generator 260 may then generate the plurality of streams in accordance with the stream forming data 212. The plurality of streams may be interleaved to form outgoing test traffic 265. Each of the streams may include a sequence of packets. The packets within each stream may be of the same general type but may vary in length and content.

The network interface unit 270 may convert the outgoing test traffic 265 from the traffic generator 260 into the electrical, optical, or wireless signal format required to transmit the test traffic to the network under test 290 via a link 295, which may be a wire, an optical fiber, a wireless link, or other communication link. Similarly, the network interface unit 270 may receive electrical, optical, or wireless signals from the network over the link 295 and may convert the received signals into incoming test traffic 275 in a format usable to the traffic receiver 280.

The traffic receiver 280 may receive the incoming test traffic 275 from the network interface unit 270. The traffic receiver 280 may determine if each received packet is a member of a specific flow, and may accumulate test statistics for each flow in accordance with test instructions 214 provided by the port CPU 220. The accumulated test statistics may include, for example, a total number of received packets, a number of packets received out-of-sequence, a number of received packets with errors, a maximum, average, and minimum propagation delay, and other statistics for each flow. The traffic receiver 280 may also capture and store selected packets in accordance with capture criteria included in the test instructions 214. The traffic receiver 280 may provide test statistics and/or captured packets 284 to the port CPU 220, in accordance with the test instructions 214, for additional analysis during, or subsequent to, the test session.

At least a portion of the outgoing test traffic 265 and the incoming test traffic 275 may be stateless, which is to say that a portion of the outgoing test traffic 265 may be generated by the traffic generator 260 without expectation of any response and the incoming test traffic 275 may be received by the traffic receiver 280 without any intention of responding. The transmission and reception of stateless traffic may be sufficient to perform layer 2 and layer 3 testing of the network under test 290. However, to test the layer 4 (or higher) performance of a network device such as a server or server load balancer, a large number of TCP connections may be required between the port unit 210 and the network under test 290 during a test session.

To establish and use TCP connections, the port CPU 220 may prepare appropriate TCP packets and provide the TCP packets 216 to the traffic generator 260. The traffic generator 260 may insert the TCP packets into the outgoing test traffic 265. The traffic receiver 280 may separate received TCP packets from received stateless traffic and send the received TCP packets 282 to the port CPU 220 for processing.

During network testing, port units of a network test equipment may function as both the client and server sides of a large number of TCP connections. Each port unit, such as the port unit 210, may emulate a plurality of servers and/or a large plurality of clients.

Figure 3:
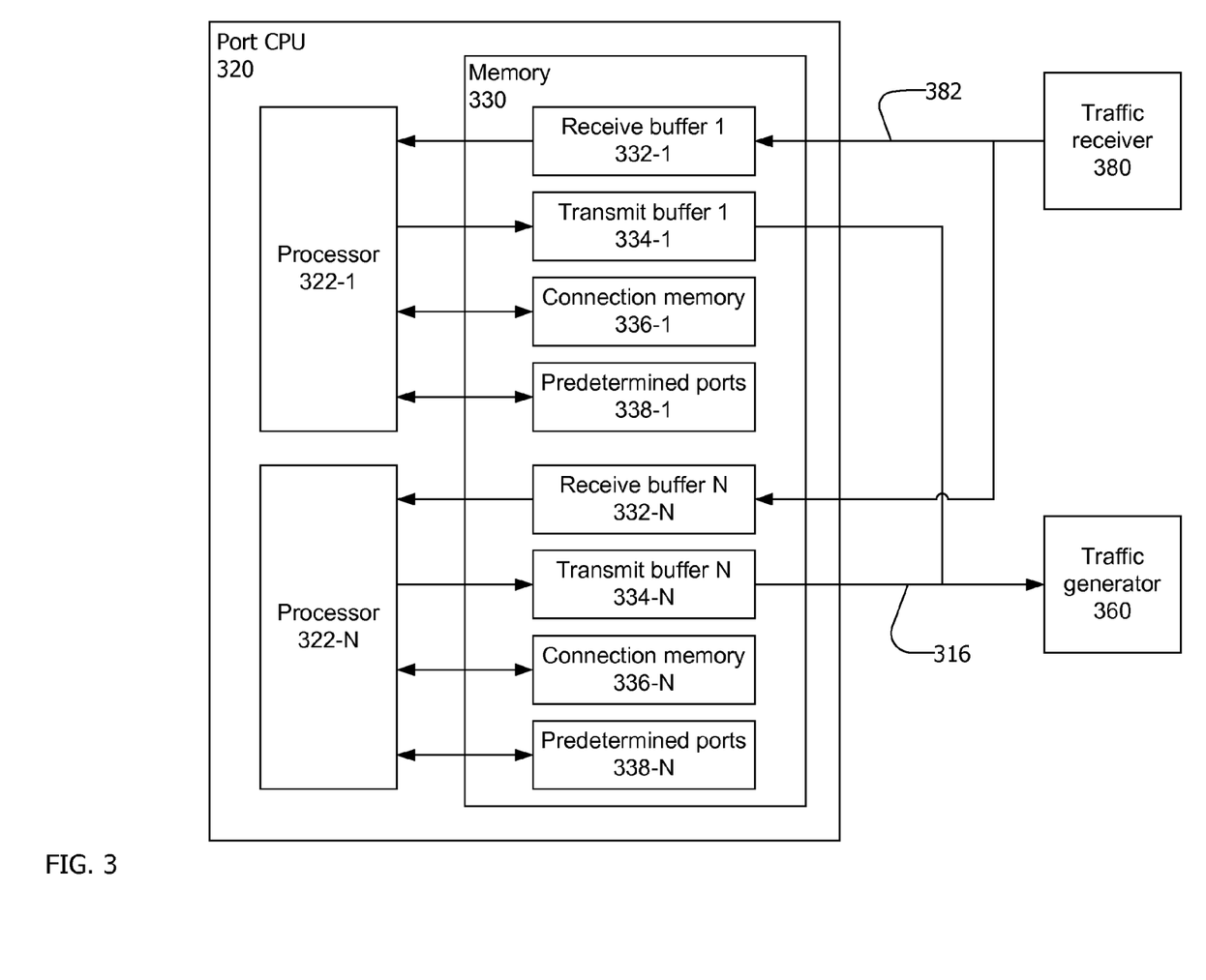
FIG. 3 is a block diagram of a port CPU.

Referring now to FIG. 3, a port CPU 320 may be suitable for use in a port unit such as the port unit 210. The port CPU 320 may include a plurality of N processors, wherein N is an integer greater than one, of which only processers 322-1 and 322-N are shown. Each of the processors 322-1 to 322-N may be 322 coupled to a memory 330. Each processor 322-1 to 322-N may have equal access to the entire memory 330 in what is commonly called a symmetric multiprocessor architecture. Alternatively, the memory 330 may include local memory (not separately shown) associated with each of the processors 322-1 to 322-N in what is commonly called a non-uniform memory access (NUMA) architecture. Within a NUMA architecture, each processor 322-1 to 322-N may access its own local memory faster than non-local memory, where non-local memory may include memory local to another processor and/or memory shared between processors. The processors 322-1 to 322-N may be processor cores within one or more integrated circuit devices.

The memory 330 may include random access memory, or a combination of random access memory and other memory such as read-only memory. The memory 330 may include a storage device. As used herein, a storage device is a device that allows for reading and/or writing to a machine readable storage medium. Storage devices include hard disk drives, DVD drives, flash memory devices, and others. Machine readable storage media include, for example, magnetic media such as hard disks, floppy disks and tape; optical media such as compact disks (CD-ROM and CD-RW) and digital versatile disks (DVD and DVD±RW); flash memory cards; and other media for storing data. The term "storage media" does not include transient media, such as signals and waveforms, for conveying data.

The memory 330 may store both data and program instructions for execution by the processors 322-1 to 322-N. Program instructions may be stored on a machine readable storage media and copied into random-access memory during execution.

The memory 330 may include a plurality of N received packet buffers, of which received packet buffers 332-1 and 332-N are shown. Each received packet buffer 332-1 to 332-N may be uniquely associated with a corresponding one of the processor 322-1 to 322-N. Each received packet buffer 332-1 and 332-N may have capacity to store at least the longest anticipated received packet. Each received packet buffer 332-1 and 332-N may have capacity to store multiple received packets. A traffic receiver 380 may write received TCP packets 382 into the received packet buffer 332-1 and 332-N, for example using direct memory access. After each received packet is stored in one of the received packet buffers 332-1 and 332-N, the traffic receiver 380 may send a signal (such as an interrupt, a flag, or another signal) to the corresponding processor 322-1 to 322-N indicating that a received packet is waiting.

When a port unit is emulating a server, a hash function may be used to ensure that all packets for a specific TCP connection are processed by the same processor 322-1 to 322-N, and to ensure that a plurality of TCP connections are distributed evenly among the processors 322-1 to 322-N. For example, hardware within the traffic receiver 380 may apply a predetermined hash function to determine which processor 322-1 to 322-N is uniquely associated with each received TCP packet. The traffic receiver 380 may then cause the received TCP packet to be placed in the receive buffer 332-1 to 332-N of the associated processor.

The memory 330 may include N transmit packet buffers, of which transmit packet buffer 334-1 and 334-N are shown. Each of the plurality of transmit packet buffers 334-1 to 334-N may be uniquely associated with a corresponding one of the plurality of processor 322-1 to 322-N. Each transmit packet buffer 334-1 to 334-N may have capacity to store at least the longest anticipated outgoing packet. Each transmit packet buffer 334-1 to 334-N may have capacity to store multiple outgoing packets. Each processor 322-1 to 322-N may write one or more packets to be transmitted into the associated transmit packet buffer 334-1 to 334-N. After each packet to be transmitted is stored, the processor 322-1 to 322-N may send a signal (such as a flag or another signal) to a traffic generator 360 indicating that a packet to be transmitted is waiting in a transmit packet buffer 322-1 to 322-N. The traffic generator 360 may then extract the packet 316 to be transmitted from the transmit packet buffer 322-1 to 322-N, for example by direct memory access.

Each processor 322-1 to 322-N may run a program or a plurality of program layers for implementing a TCP/IP stack. Each layer in the TCP/IP stack may implement one or more communications protocols. Layer 4 of the TCP/IP stack may include a TCP protocol program that causes the processor to open, manage, and close TCP connections with or through a network under test (not shown). For each TCP connection, the TCP protocol program may store TCP connection data in the memory 330. The stored TCP connection data may include, for example, the state of the connection, the highest sequence number transmitted, and the highest sequence number acknowledged. The TCP connection data may be read before each received or outgoing packet is processed and may be updated and stored after the processing of each received or outgoing packet is completed. Each processor 322-1 to 322-N may be uniquely associated with a corresponding connection memory 336-1 to 336-N.

Some or all of the processors 322-1 to 322-N may perform other functions and execute other programs in addition to processing TCP packets. Some or all of the processors 322-1 to 322-N may execute other programs during intervals between processing TCP packets. In particular, when a port unit is emulating a plurality of clients during a test session, one or more of the processors 322-1 to 322-N may execute a program to open one or more TCP connections. The port CPU 320 may receive instructions, for example from a test administrator, such as the test administrator 205, to open a plurality of new TCP connections. One or more of the processors 322-1 to 322-N may then be tasked to open the new TCP connections in accordance with the instructions.

A network test session is typically performed in accordance with a test scenario designed prior to conducting the test session. In a test scenario, each port unit of the test equipment may be assigned to emulate a plurality of client devices having different, but known, source IP addresses and may be tasked to establish TCP connections with a limited number or range of IP destination addresses and TCP destination port numbers. Thus, for a given test scenario, a large plurality of possible TCP connections may be predefined for each port unit that will emulate clients during the test session. The total number of possible TCP connections for each port unit will be limited, but still may number millions or 10's of millions of possible connections. All of the possible TCP connections might not be opened during a test session.

To open a new TCP connection, a port CPU may first define the new TCP connection by selecting an IP source address, an IP destination address, a TCP source port, and a TCP destination port. For example, the IP addresses and TCP ports may be selected randomly or sequentially with ranges of values or lists of values defined in the test scenario. However, when a port CPU, such as the port CPU 320, includes multiple processors or multiple processor cores, each TCP connection may be uniquely associated with a specific processor 322-1 to 322-N within the port unit. In this case, a processor, such as the processor 322-1, may define a TCP connection associated with a different processor, such as the processor 322-N.

Co-pending patent application Ser. No. 12/951,963 describes how a first processor may determine that a newly-defined TCP connection is associated with a second processor. The first processor may, for example, execute the same hash function used to allocated received TCP packets among multiple processors. The first processor may then pass instructions to open the new TCP connection to the second processor. However, determining which processor is associated with a newly-defined TCP connection and then passing instructions to the appropriate processor may add significantly to the processing time required to open the new TCP connections. This may be particularly true for NUMA architectures where writing to remote processor memory can require significantly more time than writing to local memory. This additional processing time may limit the performance of the port CPU and port unit, particularly during test sessions having an objective of determining how many new TCP connections a network under test can accommodate in a particular time interval.

In order to establish and maintain as many TCP connections as possible, each processor 322-1 to 322-N may be constrained to only open TCP connections that are uniquely associated with itself, which is to say that every new TCP connection is opened by the processor that will process future packet sent via the TCP connection. To ensure that each new TCP connection is opened by the processor that will process future packet sent via the TCP connection, a TCP source port number may be predetermined for each possible combination of processor, IP source address, IP destination address, and TCP destination port number. A plurality of predetermined TCP source port numbers associated with each processor 322-1 to 322-N may be stored in respective predetermined port memories 338-1 to 338-N.

The predetermined TCP source port numbers stored in the predetermined port memories 338-1 to 338-N may be determined in accordance with the technique used to allocate received TCP packets among the processors 332-1 to 332-N. For example, if a hash function is used to allocation received TCP packets, a reciprocal of the hash function may be used to calculate a predetermined source port number for each possible combination of processor, IP source address, IP destination address, and TCP destination port number. The predetermined source port number may be calculated by a computing device, such as the test administrator 205, and stored in the predetermined port memories 338-1 to 338-N prior to the start of a test session.

To open a new TCP connection during the test session, a processor 332-1 to 332-N may define the new connection from the predefined plurality of possible TCP connections by selecting an IP source address, an IP destination address, and a TCP destination port number in accordance with the test scenario. The processor 332-1 to 332-N may then retrieve the corresponding predetermined TCP source port number from the associated predetermined port memory 338-1 to 338-N. The processor may then initiate opening the defined TCP connection by sending a SYN (synchronize sequence numbers) packet containing the selected IP source address, IP destination address, and TCP destination port number and the retrieved TCP source port number. The SYN packet may be sent, for example, via the associated transmit buffer 334-1 to 334-N, the traffic generator 360, and a network under test. Subsequently, packets received via the new TCP connection will be returned to the processor that opened the connection for further processing.

Description of Processes

Figure 4:
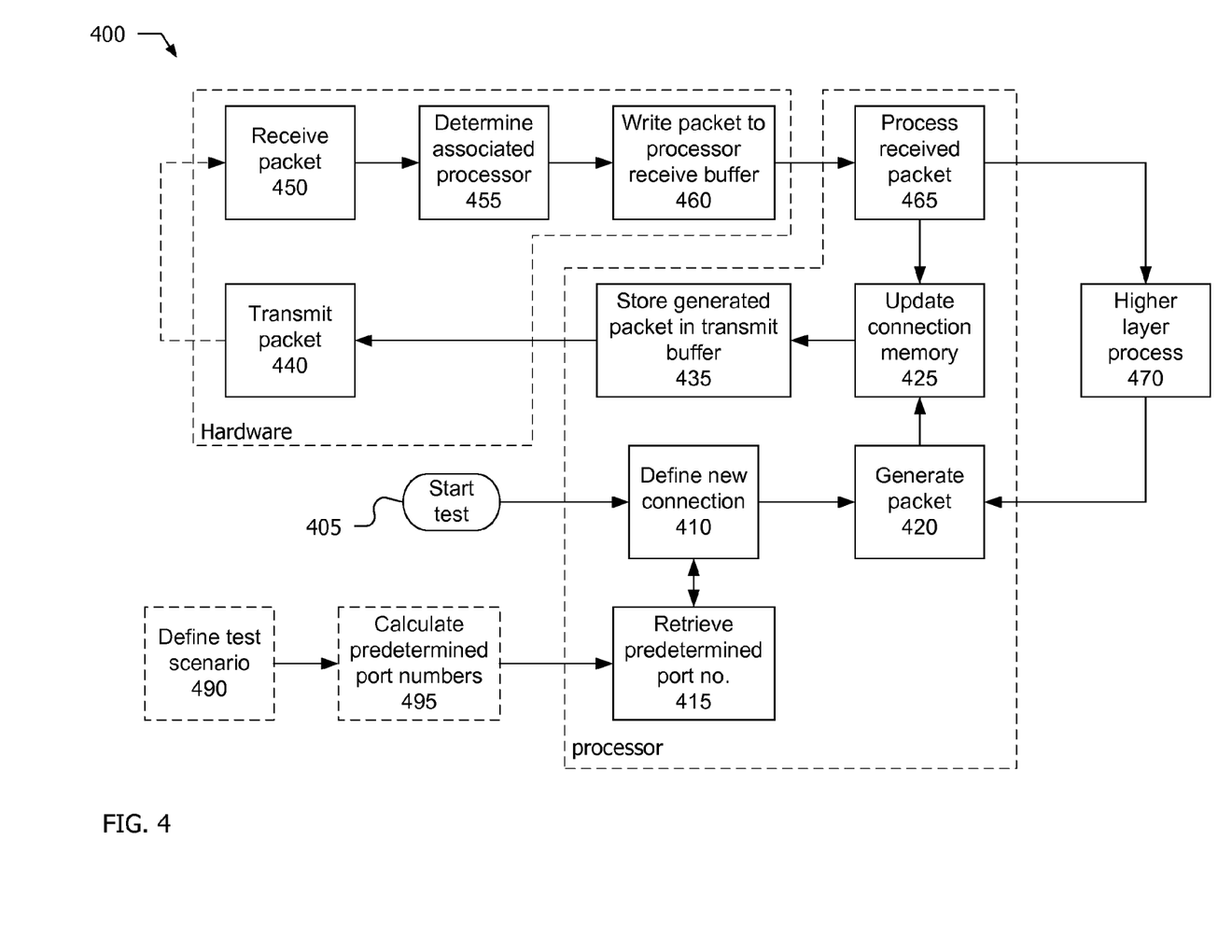
FIG. 4 is a flow chart of a process for managing a TCP connection.

Referring now to FIG. 4, a process 400 for opening and managing a TCP connection during a test session may begin at 405 when instructions to open the TCP connection are received at a port CPU such as the port CPU 320. The process 400 may be cyclic in nature, and the actions from 420 to 470 may be performed repeatedly to exchange a plurality of packets with the remote device via the TCP connection. Multiple instances of the process 400 may be performed concurrently and sequentially by multiple processors within the port CPU and by multiple port CPUs to open and maintain a large plurality of concurrent TCP connections.

Prior to conducting a test session, a test scenario may be defined at 490. The test scenario may, for example, assign an IP address or range of IP addresses to each of a plurality of port units to be used during the test session. The test scenario may further define, for reach port unit that will open TCP connections during the test session, a plurality of possible TCP connections that may be opened. Defining the plurality of possible TCP connections for each port unit may include, for example, defining a range or list of source IP addresses, a range or list of destination IP addresses, and a range or list of TCP destination port numbers. For port units that include only a single processor for processing TCP connections, the definition of the plurality of possible TCP connections may further include a range or list of TCP source port numbers.

In order to establish and maintain as many TCP connections as possible during a test session, each processor that opens TCP connections may be constrained to only open TCP connections that are uniquely associated with itself. When the processors are constrained in this manner, every new TCP connection is opened by the processor that will process future packets sent via the TCP connection. To ensure that each processor only opens TCP connections that are uniquely associated with itself, at 495 a TCP source port number may be predetermined for each possible combination of processor, IP source address, IP destination address, and TCP destination port number. A plurality or set of predetermined TCP source port numbers, corresponding to a plurality of possible TCP connections, associated with each processor may be stored in memories associated with each processor at 495, prior to the start of the test session.

At 495, the predetermined source port numbers may be determined in accordance with the technique to be used (at 455) to allocate received TCP packets among a plurality of processors. For example, if a hash function is used to allocation received TCP packets at 455, a reciprocal of the hash function may be used to calculate a predetermined source port number for each possible combination of processor, IP source address, IP destination address, and TCP destination port number. A set of predetermined source port numbers associated with each of the plurality of processors may be calculated by a computing device, such as the test administrator 205, and stored in memory such as the predetermined port memories 338-1 to 338-N prior to the start of a test session.

At 405, during the test session, a port CPU may receive an instruction to open one or more new TCP connections and a processor of a plurality of processors within the port CPU may be tasked to define the new TCP connection. At 410, the tasked processor may define the new TCP connection. Defining a new TCP connection may include defining source and destination IP addresses and a TCP destination ports in accordance with the test scenario from 490. For example, at 410, the processor may select source and destination IP addresses and a TCP destination port sequentially or randomly within predetermined value ranges defined in the test scenario.

After the new TCP connection is defined at 410, at 415 the processor may retrieve, from the memory associated with the processor, a corresponding predetermined TCP source port number (which was previously calculated at 495). The processor may then open the new TCP connection defined at 410 using the TCP source port number retrieved at 415.

To open the new TCP connection, the processor may generate a SYN packet at 420. The SYN packet may include the source and destination IP addresses and TCP destination port number from 410 and the TCP source port number from 415. At 425, the processor may update an associated connection memory, such as one of the connection memories 336-1 to 336-N, to reflect the initiation of the new TCP connection. At 435, the processor may store the SYN packet generated at 430 in a transmit buffer, such as one of the transmit buffers 334-1 to 334-N, uniquely associated with the processor. At 440, the SYN packet may then be extracted from the transmit buffer and transmitted to a remote device by hardware elements such as the traffic generator 260 and the network interface unit 270.

In response to the transmitted SYN packet, hardware elements (such as the network interface unit 270 and the traffic receiver 280) may receive a packet from the remote device acknowledging the SYN packet at 450. At 455, the hardware elements may determine which processor of the plurality of processors should process the received packet. As previously described, a hash function may be applied to the IP addresses and TCP ports identified in the header of the received packet. The hash function may return a hash value indicative of the appropriate processor to process the received packet. Since the hash value is the same for all packets transmitted or received over a specific TCP connection, a determination may be made at 455 that the processor that generated the SYN packet should process the received response packet. At 460, the received packet may be written into a receive buffer memory, such as one of the receive buffers 332-1 to 332-N, associated with the processor.

At 465, the processor may retrieve the received packet from the receive buffer and process the packet. Processing the received packet may include processing the received packet through a TCP/IP protocol stack, which is to say performing processes necessary to implement layer 2, layer 3, and layer 4 protocols of the TCP/IP protocol suite. This may include updating the connection memory to reflect receipt of the receive packet at 425. Processing the received packet may include forwarding at least some content from the packet to a higher layer process 470. The higher layer process 470 may be, for example, an application program running on the processor.

Processing the received packet at 465 may also include determining information, such as an acknowledgment number, to be included in the next packet generated at 420 for transmission to the remote device.

The process from 420 to 470 may then be repeated cyclically until the TCP connection is closed. The TCP connection may be closed by mutual agreement between the processor and the remote device, for example when there is no further information to exchange via the TCP connection. The TCP connection may be closed unilaterally, for example when the remote device does not respond within a predetermined time period.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method to test network connections using a port unit having a plurality of processors, comprising:
    defining a plurality of transmission control protocol (TCP) connections to be opened by the port unit during a test session, each TCP connection having a source internet protocol (IP) address, a destination IP address, and a destination port number;
    determining a set of predetermined source port numbers, wherein
        the set of predetermined source port number contains a predetermined source port number uniquely associated with each possible combination of one processor from the plurality of processors and one TCP connection from the plurality of TCP connections, and
        each predetermined source port number is selected such that a predetermined hash function applied to the predetermined source port number and the destination port number, the source IP address and the destination IP address of the associated TCP connection returns a hash value pointing to the associated processor;
    storing the sets of predetermined source port numbers in the port unit; and
    conducting the test session, conducting the test session further comprising:
        a first processor of the plurality of processors opening TCP connections, via the network, from the defined plurality of TCP connections,
        wherein each TCP connection is opened using the predetermined source port number uniquely associated with the first processor and with the TCP connection.

2. The method of claim 1, further comprising:
    two or more processors, including the first processor, of the plurality of processors opening TCP connections
    wherein each TCP connection is opened using the corresponding predetermined source port number from the set of predetermined source port numbers associated with the processor that opens the TCP connection.

3. The method of claim 2, wherein each processor of the plurality of processors is associated with a respective predetermined port memory, the method further comprising:
storing, for each processor of the plurality of processors, an associated subset of the set of predetermined source port numbers in the associated predetermined port memory.

4. The method of claim 3, further comprising:
each processor of the plurality of processors that opens a TCP connection retrieving the corresponding source port number from the associated predetermined port memory.

5. The method of claim 1, further comprising, after one or more TCP connections have been opened:
receiving a packet associated with a specific open TCP connection
applying the predetermined hash function to a source port number, a destination port number, a source IP address and a destination IP address extracted from the received packet to obtain a hash value pointing to a processor that opened the specific open TCP connection
directing the received packet to the processor that opened the specific open TCP connection for processing.

6. The method of claim 5, wherein each processor of the plurality of processors is associated with a respective connection memory, the method further comprising:
the processor that opened the specific open TCP connection storing connection state information in the associated connection memory.

7. The method of claim 5, wherein each processor of the plurality of processors is associated with a respective received packet queue, the method further comprising:
a hardware traffic receiver applying the predetermined hash function to obtain the hash value pointing to the processor that opened the specific open TCP connection
the hardware traffic receiver placing the received packet in the received packet queue associated with the processor that opened the specific open TCP connection.

8. A machine-readable storage medium storing instructions that, when executed by a computing device having a plurality of processors, causes the computing device to perform actions comprising:
defining a plurality of transmission control protocol (TCP) connections to be opened by the port unit during a test session, each TCP connection having a source internet protocol (IP) address, a destination IP address, and a destination port number;
storing a set of predetermined source port numbers, wherein
the set of predetermined source port numbers includes a predetermined source port number uniquely associated with each possible combination of one processor from the plurality of processors and one TCP connection from the plurality of TCP connections, and
each predetermined source port number is selected such that a predetermined hash function applied to the predetermined source port number and a destination port number, a source IP address and a destination IP address of the associated TCP connection returns a hash value pointing to the associated processor;
conducting the test session, conducting the test session further comprising:
a first processor of the plurality of processors opening TCP connections, via a network under test, from the defined plurality of TCP connections
wherein each TCP connection is opened using the predetermined source port number uniquely associated with the first processor and the TCP connection.

9. The machine-readable storage medium of claim 8, the actions performed further comprising:
two or more processors, including the first processor, of the plurality of processors opening TCP connections
wherein each TCP connection is opened using the predetermined source port number uniquely associated with the TCP connection and the processor that opens the TCP connection.

10. The machine-readable storage medium of claim 9, wherein each processor of the plurality of processors is associated with a respective predetermined port memory, the actions performed further comprising:
storing, for each processor of the plurality of processors, an associated subset of the set of predetermined source port numbers in the associated predetermined port memory.

11. The machine-readable storage medium of claim 10, the actions performed further comprising:
each processor that opens a TCP connection retrieving the corresponding source port number from the associated predetermined port memory.

12. The machine-readable storage medium of claim 8, further comprising, after one or more TCP connections have been opened:
receiving a packet associated with a specific open TCP connection
applying the predetermined hash function to a source port number, a destination port number, a source IP address and a destination IP address extracted from the received packet to obtain a hash value pointing to a processor that opened the specific open TCP connection
directing the received packet to the processor that opened the specific open TCP connection for processing.

13. The machine-readable storage medium of claim 12, wherein each processor of the plurality of processors is associated with a respective connection memory, the actions performed further comprising:
the processor that opened the specific open TCP connection storing connection state information in the associated connection memory.

14. The machine-readable storage medium of claim 12, wherein each processor of the plurality of processors is associated with a respective received packet queue, the actions performed further comprising:
a hardware traffic receiver obtaining the hash value pointing to the processor that opened the specific open TCP connection
the hardware traffic receiver placing the received packet in the received packet queue associated with the processor that opened the specific open TCP connection.

* * * * *